(12) United States Patent
Greendale et al.

(10) Patent No.: US 7,876,262 B2
(45) Date of Patent: Jan. 25, 2011

(54) RADAR SYSTEM

(75) Inventors: Steve Greendale, Great Chesterford (GB); Mark Radford, Great Chesterford (GB); David Spreadbury, Great Chesterford (GB)

(73) Assignee: Plextek Limited, Essex (GB)

( * ) Notice: Subject to any disclaimer, the term of this patent is extended or adjusted under 35 U.S.C. 154(b) by 0 days.

(21) Appl. No.: 12/487,889

(22) Filed: Jun. 19, 2009

(65) Prior Publication Data
US 2009/0295620 A1 Dec. 3, 2009

Related U.S. Application Data

(63) Continuation of application No. PCT/EP2007/064298, filed on Dec. 20, 2007.

(30) Foreign Application Priority Data

Dec. 22, 2006 (GB) .................... 0625545.9

(51) Int. Cl.
*G01S 13/536* (2006.01)
*G01S 13/538* (2006.01)
(52) U.S. Cl. ............... 342/101; 342/84; 342/89; 342/94; 342/99
(58) Field of Classification Search ........... 342/94–101, 342/160
See application file for complete search history.

(56) References Cited

U.S. PATENT DOCUMENTS 3,383,678 A 5/1968 Palmer
3,882,495 A 5/1975 Bolger
4,034,373 A * 7/1977 de Pierre et al. ............ 342/100
4,527,151 A 7/1985 Byrne
4,608,566 A 8/1986 Ennis et al.
5,262,785 A 11/1993 Silverstein et al.
5,708,437 A 1/1998 Gellekink
6,466,157 B1 10/2002 Bjornholt et al.
6,911,933 B1 6/2005 Mutz et al.
2006/0220949 A1 10/2006 Nohmi

FOREIGN PATENT DOCUMENTS

EP 0547686 A1 6/1993
GB 2430098 A 3/2007

* cited by examiner

*Primary Examiner*—Ian J Lobo
(74) *Attorney, Agent, or Firm*—BainwoodHuang (57) ABSTRACT

Electronically steered radar systems such as frequency scanning radars are particularly suitable for detecting and monitoring slow moving, ground-based targets. So-called crawler radar systems are intended for detection of targets that deliberately attempt to avoid detection by keeping low and by moving slowly. Disclosed is a radar system which includes an electronically steered antenna and a receiver arranged to process signals received from a target located at a distance from the radar system so as to identify a Doppler frequency associated with the target. The antenna stares at, rather than glides past, the target surrounding clutter. This means that the spectral spreading of static ground clutter associated with mechanical radar systems can be eliminated, overcoming one of the shortcomings of mechanical radar systems that would otherwise render a crawler radar system unsuitable for Doppler processing.

8 Claims, 6 Drawing Sheets

RADAR SYSTEM

CROSS REFERENCE TO RELATED APPLICATIONS

This patent application is a Continuation of International Patent Application No. PCT/EP2007/064298 filed on Dec. 20, 2007 and entitled "RADAR SYSTEM", the contents and teachings of which are hereby incorporated by reference in their entirety.

FIELD OF THE INVENTION

The present invention relates to a radar system, and relates specifically to electronically steered radar systems that are particularly, but not exclusively, suitable for detecting and monitoring slow moving, ground-based targets.

BACKGROUND OF THE INVENTION

Radar systems are used to detect the presence of objects and to measure the location and movement of objects. In general, radar systems are designed for a specific application: to measure distance over a specified range of distances; over a specified scan region; within a specified level of accuracy; and in relation to a specified orientation. So-called crawler radar systems are intended for detection of targets that deliberately attempt to avoid detection by keeping low and by moving slowly. Such targets can be characterised as having a radar cross sectional area of approximately $0.1\ m^2$ and moving with a speed of below 3 km/h, typically 1 km/h. Traditional radar systems that are adapted to provide crawler detection operate so as to measure thousands of small sections of land, typically 3° wide and 1 metre deep; measurements from successive scans of a given section are compared with one another, and a crawler moving into or out of a specific range cell at a particular bearing can be detected from a change in reflected energy between scans. If the land over which the crawler is moving is flat, then there is little radar energy reflected back to the radar from the land, enabling the crawler to be discriminated from the lower level background power. However, as soon as there is some level of "clutter" in the form of grass, bushes, trees etc. then the radar sees a considerably larger background clutter return, which makes it difficult, if not impossible, to distinguish the crawler from the clutter. For short grass this could be the equivalent of say one tenth of the area being illuminated by the radar: i.e. $\frac{1}{10}$ of $5\ m^2$ at 100 m (i.e. $0.5\ m^2$). Even at this short range, the traditional crawler radar will struggle to detect the additional energy of a crawler of $0.1\ m^2$ on top of the $0.5\ m^2$ from the grass. At 1000 m, the comparison is $0.1\ m^2$ on top of $5\ m^2$, which is practically impossible to detect. As a result, traditional crawler radar systems are inherently limited to maximum detection ranges of only a few hundred meters.

Typically, conventional crawler radar systems do not use the Doppler characteristics of the targets as part of the detection criteria. This is partly because the targets move slowly, but also because certain of the key characteristics associated with a crawler target make it very difficult to utilise Doppler radar systems. Moreover conventional crawler radar systems use mechanically steered antennas, for which problems with Doppler processing, such as spectral widening, are particularly acute, as will now be explained. As a mechanically steered beam moves over the terrain, the transmitted power falling on any particular spot rises as the beam approaches and falls as it recedes. Consequently, for successive radar pulses, the return power for a given reflecting surface is modulated, resulting in a widening in frequency of the return from perfectly still clutter (e.g. the ground, buildings and foliage); the portions attributable to widening are referred to as "skirts". As described in page 159 of "Radar Handbook" Published by McGraw-Hill (second edition), 1990, ISBN 0-07-057913-X, the standard deviation of this spread can be expressed as:

$$0.265 \times \frac{PRF}{n}\ Hz \qquad \text{Equation (1)}$$

where PRF is the pulse repetition frequency and n is the number of pulses generated while the antenna scans through the radar's 3 dB beam width.

$$\text{Since } n = \frac{PRF\ (Hz) \times 3\ dB \cdot beamwidth \cdot (°)}{scanrate \cdot (°/sec)} \qquad \text{Equation (1)}$$

can alternatively be expressed as $$0.265 \times \frac{scanrate \cdot (°/sec)}{3\ dB\ b \cdot beamwidth \cdot (°)}\ Hz$$

A scan rate of 35°/sec with a 3° beamwidth gives a standard deviation of 3.1 Hz. Typically 95% of the power of a Normal Distribution is contained in ±2 standard deviations, which implies that the static clutter energy could be expected to significantly affect the Doppler region extending approximately 6 Hz either side of the DC component associated with static clutter.

If the clutter comprises foliage, this will inevitably have a dynamic and weather-dependent characteristic, resulting in a further spectral widening of the return signals.

Turning to aspects of the signal processing, the spectral computation process assumes that the captured signal is one of an infinite number of identical sections, each abutting a successive section; however, the boundary between successive sections can include abrupt discontinuities. These are suppressed by means of windowing the signal between the successive sections, effectively importing returns from adjacent bins into a given bin. Whilst this has the benefit of reducing the effect of the discontinuities it also results in spectral spreading of each signal component, including the DC component associated with static clutter.

SUMMARY OF THE INVENTION

In accordance with a first aspect of the present invention, there is provided a radar system capable of detecting a slow moving target having a radar cross section area of less than $0.2\ m^2$, the radar system comprising an electronically steered antenna and a receiver arranged to process signals received from a target located at a distance from the radar system so as to identify a Doppler frequency associated with the target.

Since embodiments of the invention utilise electronically steered antennas, the antenna stares at, rather than glides past, the target and surrounding clutter. This means that the spectral spreading of static ground clutter associated with mechanical radar systems can be eliminated, overcoming one of the shortcomings of mechanical radar systems that would otherwise render a crawler radar system unsuitable for Doppler processing.

Preferably the electronically steered antenna is arranged to transmit signals in a plurality of directions so as to steer a beam over an angular extent, and the electronically steered antenna is arranged to transmit signals in a given one of the plurality of directions for a period, said period having a duration at least ten times that of a corresponding period suitable for Doppler processing of a target having a radar cross section area of 1 $m^2$ located at said distance from the radar system. The electronically steered antenna can be embodied as a frequency scanning antenna or as a phased array antenna.

In relation to a frequency scanning antenna, Applicant's co-pending International patent application having application number PCT/EP2006/068730 describes detection of targets located at a distance of 1.7 km from the radar that have a radar cross section area of 1 $m^2$ by means of a modulation pattern that is repeated 512 times for any given carrier frequency. In one embodiment of the present invention—one in which the electronically scanned antenna is embodied as a frequency scanning antenna—a target of 0.1 $m^2$ can be detected at a distance of 1.3 km from the radar system when the modulation pattern is repeated at least 1024 times; in this example the period in which signals are transmitted has increased fourfold compared to that required to detect a 1 $m^2$ target located at a distance of 1.7 km from the radar. A radar system according to embodiments of the invention is of course capable of detecting targets of cross sectional area greater than 0.2 $m^2$ but importantly is capable of detecting targets having cross sectional areas down to 0.05 $m^2$ by a corresponding, relative increase in the transmission period. The modulation pattern could be transmitted any number of times, such as 1024, 2048, 4096 etc (powers of two are preferable when the returns from the target are processed by a Fast Fourier Transform (FFT), since this is particularly efficient computationally for $2^n$ samples; however powers of 2 are not mandatory).

This relative increase in duration of target-stare means that a proportionately greater number of data are collected by the receiver, enabling the receiver to increase the Doppler and range gate resolutions. This increased range resolution reduces the relative power of the clutter within a given range gate and the increased Doppler resolution improves the ability to separate returns from targets from clutter in the Doppler domain. Both improvements have the effect of improving the signal to noise ratio (SNR).

Preferably, the receiver includes a low frequency blocking filter and a Doppler processor for deriving Doppler frequency data: the low frequency blocking filter is arranged to identify an average magnitude of said signals received from a target and to subtract the identified average magnitude from respective said signals prior to Doppler processing. Preferably the low frequency blocking filter operates on data output from a Range FFT and the Doppler processor is a Doppler FFT. The blocking filter has the effect of removing the energy component in the zero order Doppler FFT bin that is attributable to stationary clutter, and it advantageously removes clutter components that would otherwise be spread to adjacent bins as part of the post-processing windowing of the processed data. Since, for ground-based radar the amplitude of this stationary clutter tends to be large (relative to the signal from the target), removal of this clutter improves the visibility and detectability of small, low-speed targets such as those characterised in the background section. In addition, the increased Doppler resolution means that the spectral spreading caused by windowing (which is independent of the length of the Doppler FFT) is reduced in absolute frequency terms.

For the case where the electronically steered antenna is embodied as a frequency scanning antenna, the radar system incorporates a frequency source that minimises the amount of phase noise in the signal, so as to reduce the oscillator-dependent spreading around returns. Most known synthesisers utilise a fixed frequency source (e.g. in the form of a crystal oscillator), which, in order to generate a range of frequencies, are integrated with a circuit that includes a phase detector, frequency dividers and a variable frequency oscillator (conventionally referred to as Phase Locked Loop Synthesisers). Such variable frequency oscillators inherently have a certain amount of phase noise (typically referred to as dither) in the output signals, and phase locked loop synthesisers multiply up the signal received from the signal generator, including the noise. As a result, a signal with a significant amount of dither, when reflected from a stationary target, can confuse the signal processing components and appear as a moving target. Preferably, therefore, the frequency generator is embodied as a digital signal generator that minimises the amount of multiplication of a given signal, thereby incurring substantially less phase noise than that generated by conventional signal generators. In addition, this means that phase locked loops of signal generators embodied according to the invention are capable of operating at higher loop frequencies than is possible with conventional arrangements.

In preferred arrangements, the electronically steered radar system is a Frequency Modulated Continuous Wave (FMCW) radar system, which is arranged to output a frequency modulated signal of a predetermined pattern, preferably comprising a sequence of linear frequency sweeps. In a most convenient arrangement the digital synthesiser is responsive to inputs so as to repeat the modulation pattern a predetermined number of times.

The radar system might be physically located on the ground or sited upon an object that is itself grounded (such as on a floor of a building or upon a vehicle In one arrangement the radar system is arranged to transmit data indicative of radiation received and processed thereby to a remote processing system for display, review and interpretation at the remote processing system instead of at the radar system, thereby further reducing the processing and control components required by the radar system. Advantageously, and as will be appreciated from the foregoing, since a radar system according to this aspect of this invention is neither bulky nor heavy, it readily lends itself to portability.

Further features and advantages of the invention will become apparent from the following description of preferred embodiments of the invention, given by way of example only, which is made with reference to the accompanying drawings.

Several parts and components of the invention appear in more than one Figure; for the sake of clarity the same reference numeral will be used to refer to the same part and component in all of the Figures. In addition, certain parts are referenced by means of a number and one or more suffixes, indicating that the part comprises a sequence of elements (each suffix indicating an individual element in the sequence). For clarity, when there is a reference to the sequence per se the suffix is omitted, but when there is a reference to individual elements within the sequence the suffix is included.

DETAILED DESCRIPTION OF THE INVENTION

Figure 1:
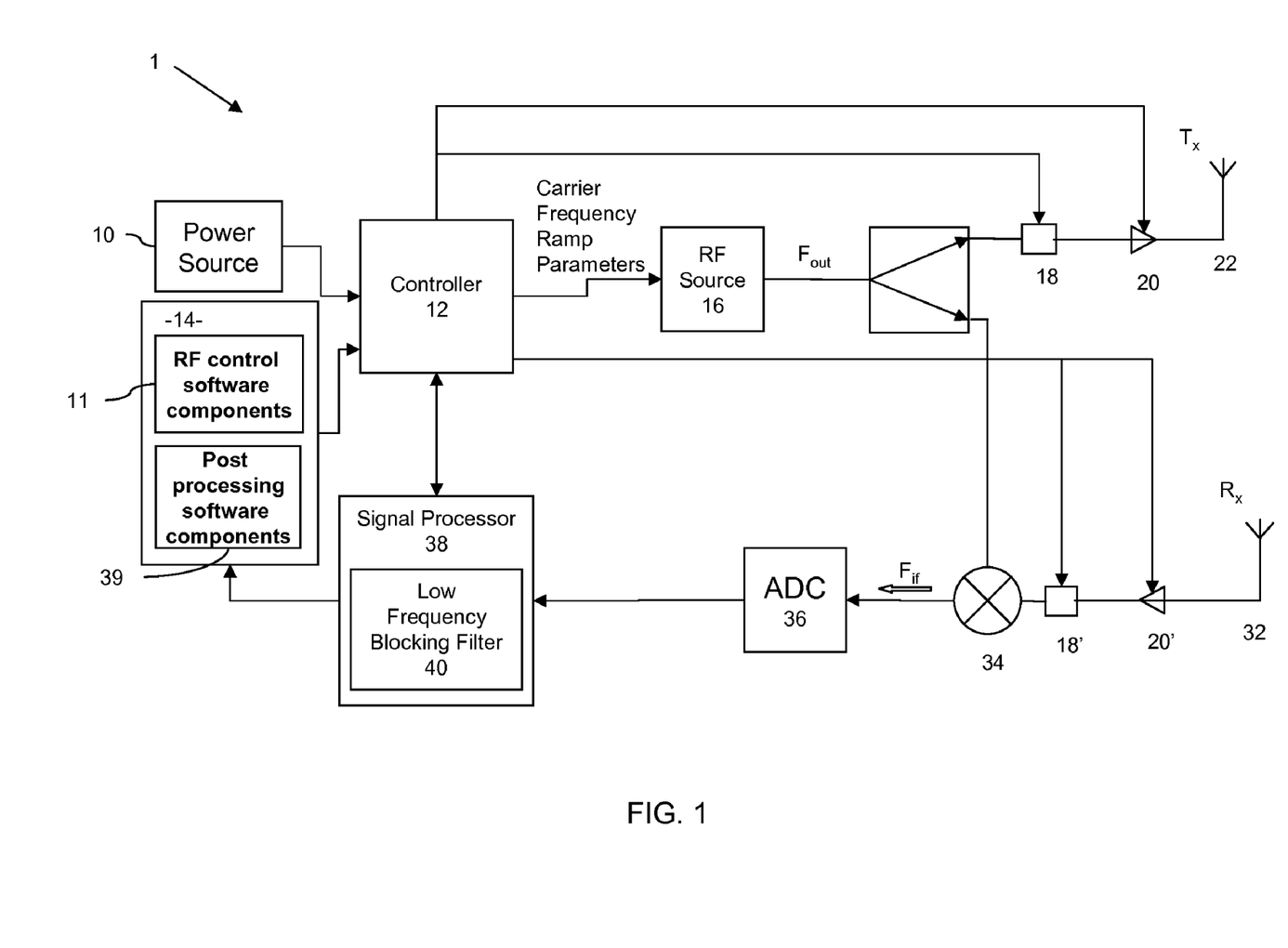
FIG. 1 is a schematic block diagram showing components of a radar system according to embodiments of the invention.

FIG. 1 shows a radar system 1 according to embodiments of the invention, comprising a power source 10, a controller 12, and a computer 14, the power source and computer 10, 14 being arranged to provide power to, and operational control over, the controller 12. As will be described in more detail below, in a first embodiment of the invention the antenna 22 is of the frequency scanning type, and the controller 12 comprises a microprocessor and a set of instructions (not shown) for execution thereby, effectively generating control signals that cause the RF frequency source, or signal generator 16, to output RF energy at a specified frequency $F_{OUT}$; this output signal, under control of switches 18 and amplifiers 20, drives antenna 22 (whilst the Figure shows a switch component 18, it will be appreciated that in this particular arrangement—in which there is only one antenna 22—the switch 18 is inessential).

In this embodiment the radar system 1 also includes a receiving antenna 32, which receives radiated signals reflected back from objects, and passes the received radiation through switch and amplifier components 18', 20' to mixer 34. The mixer 34 comprises two inputs: a first connected to the RF source 16; and a second connected to the receiving antenna 32. The output of the mixer 34 is fed to an Analogue to Digital converter ADC 36, to produce a digitised signal for input to the signal processor 38, which performs analysis of the received signal. The signal processor 38 performs a spectral analysis on the received signals, because the range between the radar system and external (reflecting) objects is contained as frequency information in the signal. Aspects of the receiving and processing components are described in detail below, but first aspects of the RF frequency source and antenna will be described.

Figure 2:
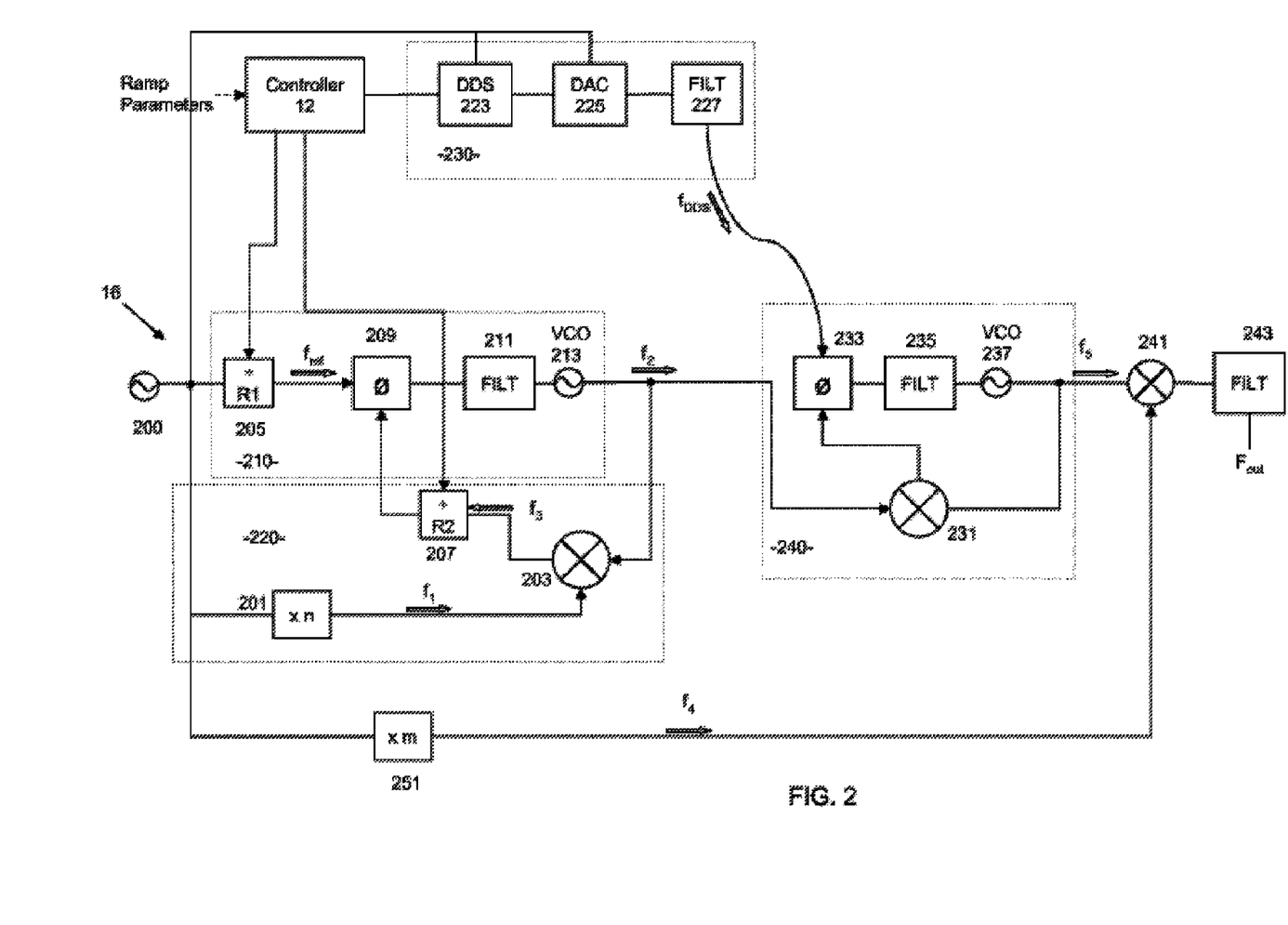
FIG. 2 is a schematic block diagram showing an arrangement of components of a frequency generator shown in FIG. 1.

FIG. 2 shows components of the RF frequency generator 16 according to an embodiment of the invention, which is preferably used to generate signals having a range of frequencies. Referring to FIG. 2, the frequency generator 16 is a digital synthesiser comprising a frequency source 200, first circuit portion 210 and a second circuit portion 220. The first circuit portion 210 comprises a frequency divider 205, a phase comparator 209, a filter 211, and a Voltage Controlled Oscillator VCO 213, while the second circuit portion 220 comprises a frequency divider 207, static multiplier 201 and a mixer 203; the multiplier 201 is arranged to increase the frequency of the signal output from oscillator 200 to as high a value as possible (e.g. the lower limit of the desired output frequency of VCO 213), while the mixer 203 serves to output signals of frequency equal to the difference between $f_2$ and $f_1$, thereby effectively stepping down the output of the VCO 213. As a result, the magnitude of the frequency input to divider 207 is relatively low, which means that for tuning of the output of VCO 213, the value of R2 can be far lower than that possible with conventional arrangements. This reduces the amount of phase noise in the output signal $F_{OUT}$.

Figure 3:
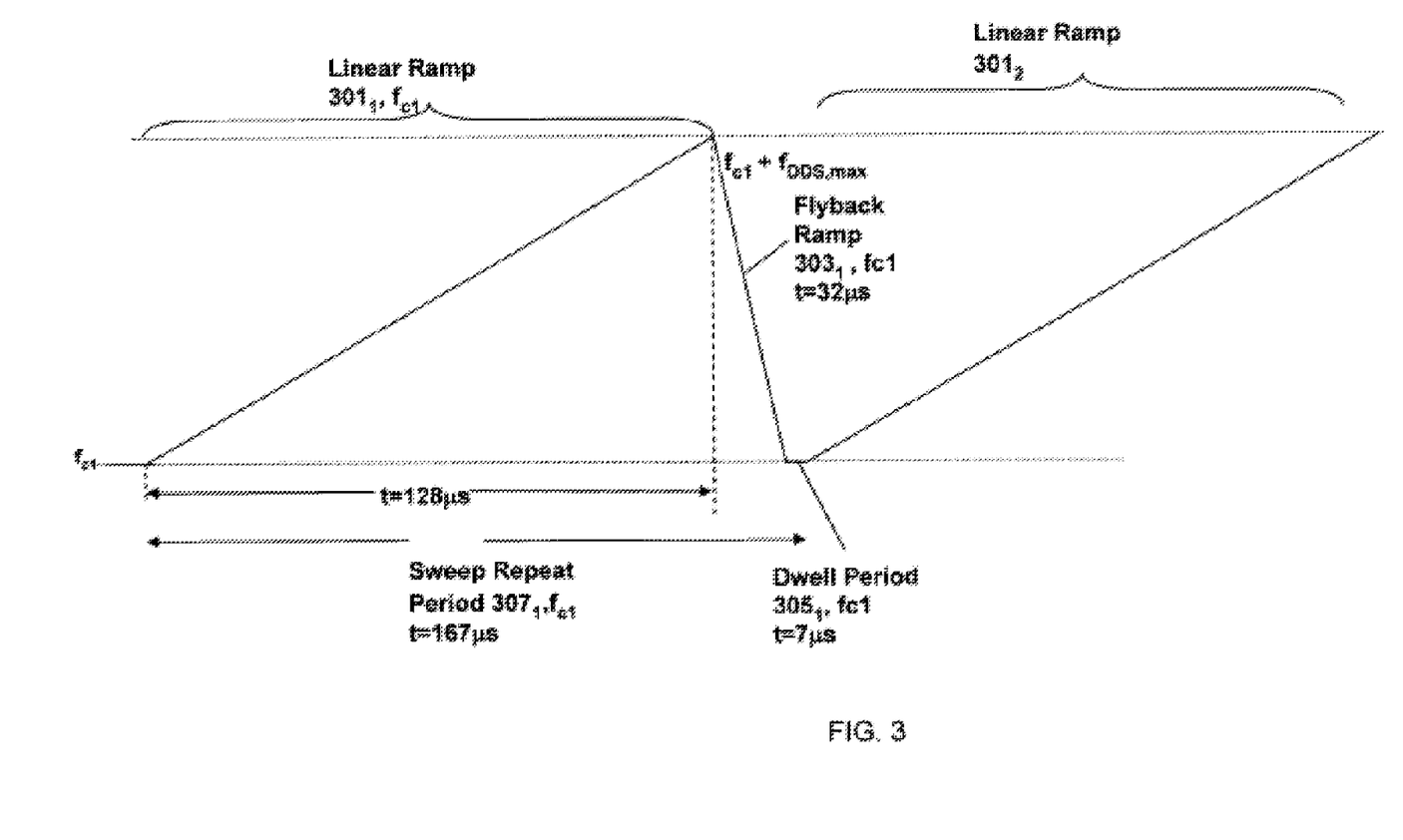
FIG. 3 is a schematic diagram showing a modulation pattern for use by the frequency generator of FIG. 2.

The signals output from the second circuit portion are then modulated by output $f_{DDS}$ of a third circuit portion 230, which in one arrangement comprises a Direct Digital Synthesiser 223, a Digital to Analogue Converter DAC 225 and a low pass filter 227. The third circuit portion 230 is configured, under control of the controller 12 shown in FIG. 1, to generate a repeating pattern comprising a linear frequency ramp. The ramp has a specified duration and magnitude, values of which are programmed via the controller 12. FIG. 3 shows an example of one such frequency ramp $301_1$ for a given carrier frequency $f_{c1}$, the duration of which is approximately 128 µs, the magnitude of which, in terms of range of frequencies ($f_{DDS,max}$-$f_{DDS,min}$), is approximately 20 MHz, and is followed by a flyback ramp $303_1$ to prepare the third circuit portion 230 for the next ramp $301_2$. The pattern repeats at a predetermined rate—in the present example a rate of 6 kHz (thus a sweep repeat period 307 of 167 µs) is a convenient choice. Such a modulation pattern is entirely conventional and the foregoing details are included as illustrative; the skilled person will appreciate that any suitable values could be selected, dependent upon the use of the radar system (e.g. the nature of the targets to be detected).

For each carrier frequency, the third circuit portion 230 is arranged to repeat the linear ramp pattern at least, and typically greater than, 1024 times, the number being selected so as to increase the resolution of the signal processing components (to be described below), and corresponding to the radar "staring" at a given point for longer than is typical of conventional scanning radar systems. This feature of the invention exploits a key feature of a crawler, namely that the crawler moves slowly; this feature enables the radar to both transmit on any given part of the scan, and capture information relating to all of the targets of interest, for longer than is possible with radar systems designed to track targets moving with higher velocities. This means that a larger number of returns are collected by the signal processing circuitry and results in a greater distinction between static clutter and a crawler, since it facilitates increased radar sensitivity and thus detection of small crawler targets.

Preferably, and in order to save power, it is to be noted that the antenna 22 is not energised during either of the flyback ramp or dwell periods 303, 305.

Turning back to FIG. 2, the output $f_{DDS}$ of the third circuit portion 230 is input to a fourth circuit portion 240, which comprises a phase comparator 233, a filter 235, a Voltage Controlled Oscillator 237 and a mixer 231. The mixer receives signals output from the second circuit (having frequency $f_2$) and signals output from the VCO 237 (having frequency $f_5$) and outputs a signal at a frequency equal to the difference in frequency between $f_2$ and $f_5$. The phase comparator 233 outputs a phase-error signal, of magnitude dependent on the difference between ($f_2$-$f_5$) and $f_{DDS}$ to the VCO 237, and the fourth circuit portion 240 operates so as to cause the output from the VCO 237 to stabilise accordingly.

The signals output from the fourth circuit portion 240 (having frequency $f_5$) are then combined, by means of mixer 241, with signals of a reference frequency $f_4$, which are signals output from the oscillator 200 having been multiplied by a second static multiplier 251, and the output is filtered (filter 243) so as to generate a signal having an output frequency $F_{OUT}$. It will be appreciated from FIG. 2 that when the signal generator 16 is operable to output signals corresponding to a carrier frequency of between 15.5 GHz and 17.5 GHz, for a crystal oscillator 200 outputting signals of frequency 100 MHz, the second static multiplier 251 is of the order 130.

Whilst the signal generator 16 could be used to generate frequencies within any selected range of frequencies, when used as a ground-based radar system, the frequency range can fall within the X band (8 GHz-12.4 GHz); the Ku band (12.4 GHz-18 GHz); the K band (18 GHz-26.5 GHz); or the Ka band (26.5 GHz-40 GHz), and most preferably within the Ku band, or a portion within one of the afore-mentioned bands. Thus for each carrier frequency the frequency generator 16 generates a repeating pattern of frequency modulated signals of various carrier frequencies.

Figure 4:
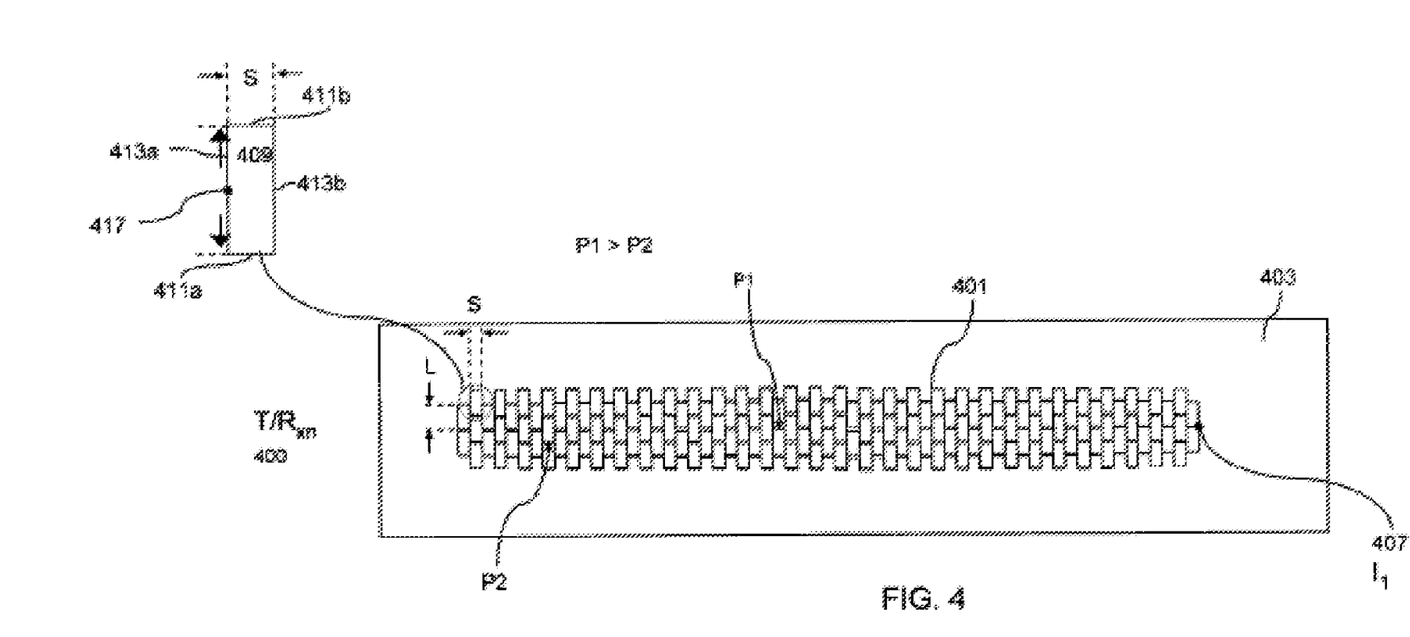
FIG. 4 is a schematic diagram showing an embodiment of an antenna array utilised in the antenna shown in FIG. 1.

Turning now to the antenna, this can be embodied as a travelling wave antenna structure comprising one or two array antennas, one such antenna array 400 being shown in FIG. 4. In one arrangement, the antenna array comprises a mesh structure 401 and a dielectric base 403 and has input means 407 for inputting energy to the mesh structure 401, together with a ground plane. The input means 407 can comprise coaxial feeds positioned orthogonal to the plane of the antenna array 400, but the skilled person will appreciate that alternative feeds could be used. Each mesh structure 401 comprises a plurality of rectangular interconnected elements 409 that are disposed on a surface of the dielectric base 403; each rectangular element 409 comprises two sides 413a, 413b and two ends 411a, 411b, the length L of the sides 413a, 413b being greater than the length S of the ends 411a, 411b. The physics underlying the operation of the travelling wave antenna are well known, having first been investigated by John Kraus and described in U.S. Pat. No. 3,290,688. It will be appreciated from the teaching in U.S. Pat. No. 3,290,688 that mesh configurations other than rectangular and planar can be used. In a preferred arrangement the antenna can be embodied as a micro circuit strip. An advantage of the antenna structure comprising two antenna arrays is that, for any given radio frequency, the antenna structure is capable of transmitting the radio frequency energy within different angular regions, the size of the angular region being dependent on the orientation of a respective array antenna.

It will be appreciated from the foregoing that the frequency $f_{OUT}$ of signals output from the signal generator 16 is controlled by the controller 12. In addition to controlling the duration and rate of the ramp as described above, the controller 12 is arranged to select a different value for carrier frequency after the ramp pattern has been repeated a specified number of times for a given carrier frequency (examples of a minimum of 1024 were given above), thereby steering the antenna in the azimuth plane. In one arrangement the values for the carrier frequency can be selected from a look-up table accessible to the controller 12 (e.g. stored in local memory or on the computer 14), this look-up table being particular to a given antenna array 400a, 400b.

Figure 5:
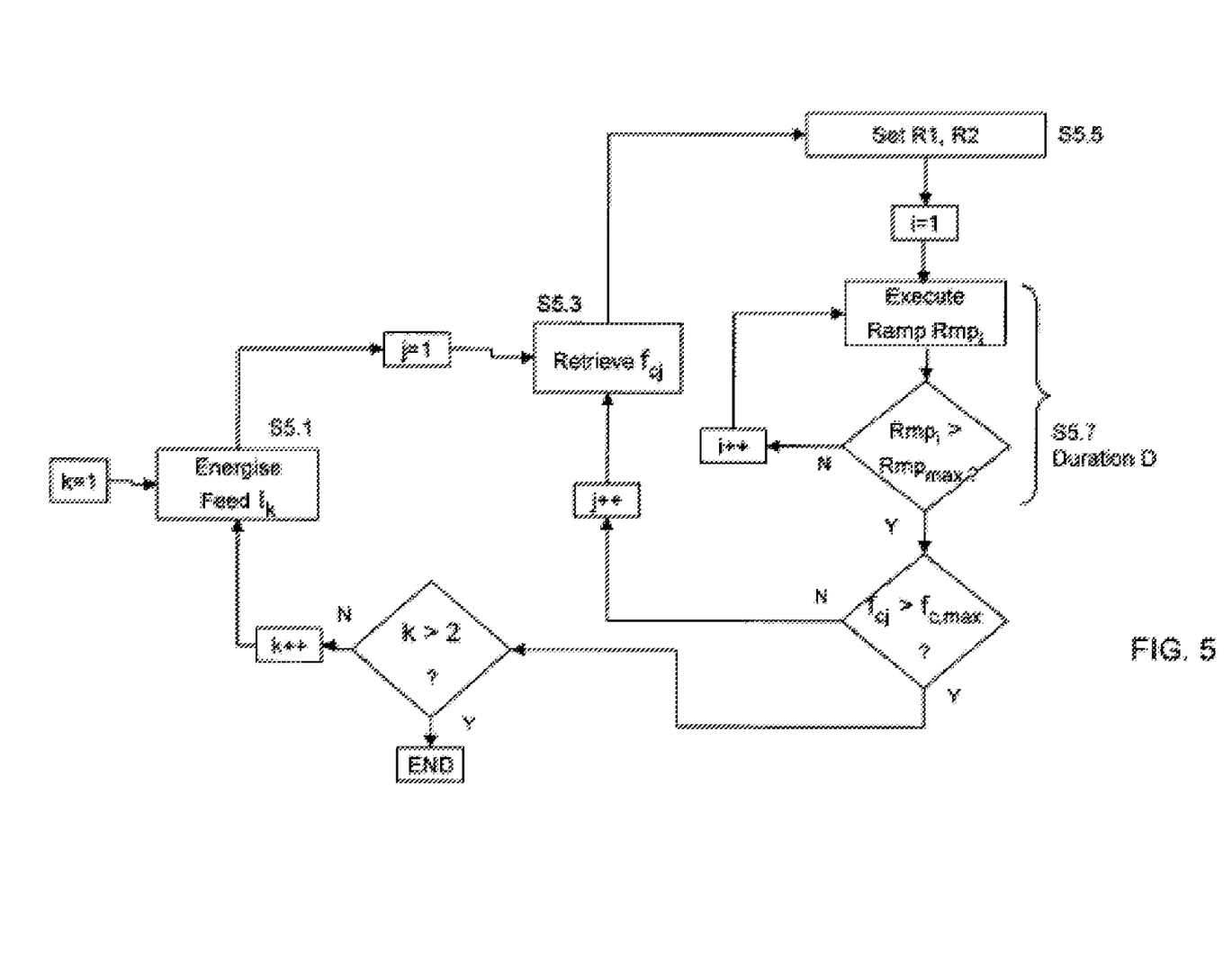
FIG. 5 is a schematic flow diagram showing steps performed by the controller shown in FIG. 1 during steering of the radar system of FIG. 1.

Operation of the radar system 1 described above will now be described with reference to FIG. 5, which is a schematic flow diagram showing steps carried out by the controller 12. At step S5.1 the controller 12 energises one of the input feeds $I_k$ of the antenna structure, e.g. by appropriate configuration of the switch 18; at S5.3 the controller 12 retrieves the value of the first carrier frequency $f_{c1}$ (e.g. from the look-up table mentioned above), and at step S5.5 the controller 12 sets the values of R1 and R2 accordingly (to set the carrier frequency) and causes the third circuit portion 230 to generate the ramp pattern a predetermined number of times $Rmp_{max}$ (S5.7), to repeatedly modulate the carrier frequency. Having reached $Rmp_{max}$, the controller retrieves the value of the next carrier frequency $f_{c2}$ and sets the values R1, R2. Preferably the overall duration of step S5.7—in other words the duration of any given set of repetitions of the linear ramp $301_i$ pattern—is the same for all values of the carrier frequency, $f_{cj}$. These steps are repeated, as shown in FIG. 5, for each feed point $I_1$ $I_2$ to the antenna structure, thereby causing the antenna structure to progressively scan over an angular extent.

The description has thus far focussed on the generation and transmission of signals from the radar system 1; referring to FIG. 1, aspects of with receiving and processing of signals will now be described. As can be seen from FIG. 1 the radar system 1 preferably also includes a separate antenna 32 embodied as structure for receiving radiation, which corresponds to the transmitting antenna structure described above. The signals received by the antenna 32 are input to mixer 34, together with the output $f_{OUT}$ from the RF frequency generator 16, and, in accordance with standard homodyne operation, the output from the mixer 34 is fed through an ADC 36 to produce a digitised Intermediate Frequency ($F_{if}$) signal as input to the signal processor 38. Energising of the receiving antenna structure 32 is performed under control of the controller 12, via switch 18', and, as for the transmitting antenna structure, this occurs during the linear ramp period only $301_i$.

The signal processor 38 is conveniently embodied as a programmable logic controller (PLC) and a plurality of software components, which run locally on the PLC 38 in response to signals received from a conventional PC computer 14 and which are written using the proprietary programming language associated with the PLC 38.

Figure 6:
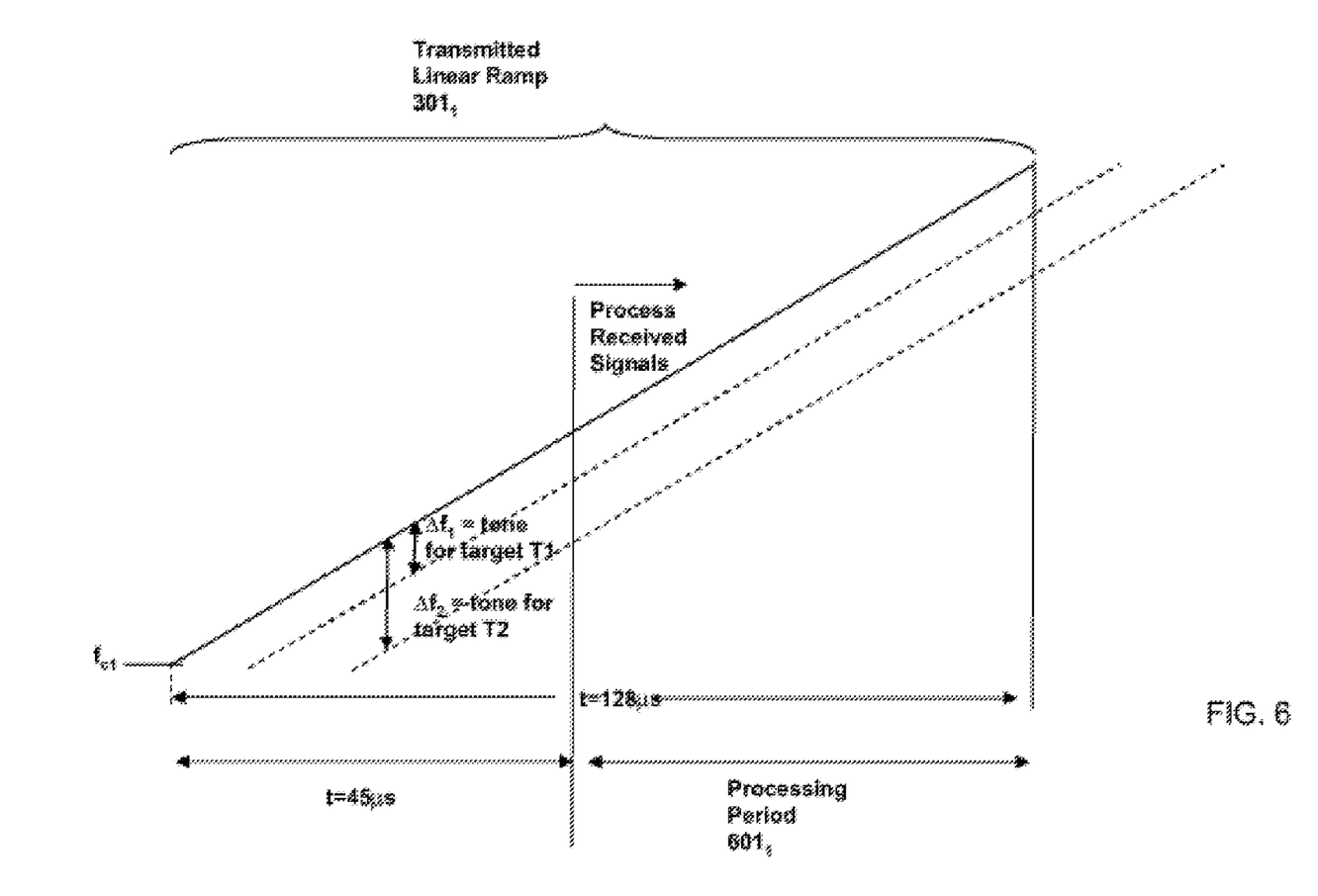
FIG. 6 is a schematic diagram showing processing of signals in relation to a transmitted modulation pattern.

As described above, the radar system 1 operates according to homodyne principles, which means that the Intermediate Frequency $F_{if}$ is equal to differences between the received signal frequency and the transmitted signal frequency. In embodiments of the invention, as will be appreciated from the foregoing and FIGS. 2 and 3 in particular, the output of the radar system 1 is a sequence of frequency sweeps $301_i$. It is a well known principle of radar that targets located in the path of a given transmitted beam will reflect the transmitted signals; since the transmitted signal in embodiments of the present invention comprises a linear frequency sweep $301_i$, the reflected signals also comprise a linear frequency sweep. Targets that are stationary will generate reflected signals that are identical to the transmitted signals (albeit somewhat attenuated), but separated therefrom at a constant frequency difference referred to herein as a tone. Referring to FIG. 6, it will be appreciated from the Figure that different targets T1, T2—located at different distances from the radar system 1—reflect the transmitted sweep $301_i$ at different delays in relation to the time of transmission, and that therefore targets T1, T2 at these different locations will be associated with different tones $\Delta f_1$, $\Delta f_2$.

In view of the fact that the signals output from the mixer 34 contain tones, the signal processor 38 is arranged to delay the processing of signals until the ramp 301 has traveled to the extents of the detection region and back. Thus for example, if the detection region extended to 6.75 km from the radar system 1, the signal processor 38 would start processing signals output from the mixer 34 at:

$$\frac{6750 \times 2}{3 \times 10^8} = 45 \ \mu s$$

from the start of transmission of a given ramp $301_i$.

As will be appreciated from the foregoing, the linear ramp $301_i$ is transmitted a plurality of times for each carrier frequency. Accordingly the signal processor 38 processes data received during a corresponding plurality of processing periods $601_i$, and generates, by means of a Range FFT, a set of return samples, individual members of which are assigned to a respective set of range gates for each said processing period $601_i$.

As is well known in the art, range gates represent successive distances from the radar system 1, such that if return samples fall within a given range gate, this indicates the presence of a target located at a distance equal to the range gate within which the return sample falls. In embodiments of the invention the received tones $\Delta f_1, \Delta f_2 \ldots \Delta f_m$ are firstly sampled at a predetermined sampling rate; each sample contains zero, one or a plurality of tones, each relating to signals reflected from targets and the sampling rate is selected so as to as ensure that phase shifts of the transmitted signal, which are induced by moving targets, can be captured. In one arrangement the ADC sampling rate is 25 MHz, and the Range FFT comprises 2048 points, so that for a ramp rate (slope of the linear ramp 301) corresponding to $183 \times 10^9$ Hz/sec, the range gate resolution is 9.5 m.

Having transformed the received signals into range gates the signal processor 38 is arranged to take the FFT of the return samples assigned to each given range gate. In the current example it will be appreciated that each set of range gates corresponds to transmission of a linear ramp $301_i$ (for a given carrier frequency), and that the sampling rate in relation to range gates—the rate at which data falling within a given range gate are computed—is the frequency at which the pattern of transmission of linear ramps $301_i$ is repeated (commonly referred to as the Pulse Repetition Frequency (PRF)). In the example given above, and with reference to FIG. 3, this is nominally 6 kHz. Accordingly, for each carrier frequency, the signal processor 38 effectively generates an array of data, each row in the array corresponding to a given processing period $601_i$, and each column in the array corresponding to a given range gate.

As is known in the art, the signal processor 38 can be arranged to store each set of range gate samples in a "row" of a conceptually rectangularly-organised memory, referred to as a corner turning store, each row corresponding to range gates falling within a given processing periods $601_i$ and thus to a particular linear ramp $301_i$. The output from the Range FFT comprises amplitudes and phases of various components of signal energy which fall on frequencies spaced linearly at the inverse of the duration of a complete signal sample set (as described above, in embodiments of the invention, the signal set comprises tones, not absolute frequency values). Once all 1024 linear ramps $301_1 \ldots 301_{1024}$ have been transmitted, each column—i.e. the output of each range gate—is read out and the average value of all of the samples assigned to a given range gate is computed. The evaluated average value is then subtracted from each and every sample assigned to the given range gate. This essentially removes the DC component from the given range gate, facilitating removal of signals due to static clutter, and enables near-by frequencies to be more precisely detected. This function of the signal processor 38 can be provided by a low frequency blocking filter 40.

Once the DC component has been removed, the data are processed by a Doppler FFT. Considering, for the sake of clarity, one processing period $601_1$, the signal processor 38 essentially calculates the Doppler frequency of targets within range of the transmitted beam—and which reflect the transmitted beam. In the current example, therefore, and assuming the signal sample set for a given carrier frequency to comprise the 1024 linear ramps $301_1 \ldots 301_{1024}$ transmitted at a rate of 6 kHz, there are 1024 Doppler FFT output bins, each represents a different velocity and being spaced apart at a Doppler frequency of 6000/1024=5.8 Hz; for a carrier frequency of 15 GHz, this is equivalent to 0.06 m/s. Stationary targets will appear in bin 0, while moving targets will appear in a bin dependent on their velocity: for example a target travelling at 10 m/s will appear in bin 172. These figures are to be compared with those obtained for a PRF of 8 kHz and a 512 point FFT, for which the Doppler resolution is 0.15625 m/s, meaning that a target travelling at 10 m/s will appear in bin 64. This example illustrates the improvement in Doppler resolution made possible with embodiments of the invention.

Additional Details and Alternatives

In the afore-described embodiment the antennas 22, 32 are of the frequency scanning antenna type. However, the antennas 22, 32 could alternatively be embodied as the phased array type, in which a phase and amplitude weight is applied to individual elements of an antenna array, and the beam is steered by modifying the phase slope applied across the array. Alternatively a time delay can be applied to an element of an antenna array so as to steer the beam. When the beam is steered by means of time delays, the transmitting circuitry can include a plurality of delay units, which are configured so as to combine different magnitudes of delay.

Returning to the embodiment featured in the specific description, the antenna structure is based on travelling wave antenna technology; however the frequency scanning antenna could alternatively be embodied as a waveguide in the form of a serpentine antenna or similar. A suitable antenna is described in U.S. Pat. No. 4,868,574. The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A frequency modulated continuous wave radar system capable of detecting a slow moving target, the radar system comprising an electronically steered antenna and a receiver arranged to process signals received from a target located at a distance from the radar system so as to identify a Doppler frequency associated with the target, the receiver comprising:
    a signal processor operable to derive frequency tone data corresponding to a plurality of range gates;
    a low frequency blocking filter; and
    a Doppler processor for deriving Doppler frequency data, wherein said low frequency blocking filter is arranged to identify an average magnitude of said derived frequency tone data for respective range gates and, for each of the plurality of range gates, to subtract respectively identified average magnitude of said frequency tone data from said derived frequency tone data associated with a respective range gate signal prior to processing by the Doppler processor.

2. A frequency modulated continuous wave radar system according to claim 1, wherein the radar system is capable of detecting a target having a radar cross section area of less than 0.2 m² and the electronically steered antenna is arranged to transmit signals in a plurality of directions so as to steer a beam over an angular extent, the electronically steered antenna being arranged to transmit signals in a given one of the plurality of directions for a period, said period having a duration at least ten times that of a corresponding period suitable for Doppler processing of a target having a radar cross section area of 1 m² located at said distance from the radar system.

3. A frequency modulated continuous wave radar system according to claim 2, wherein the receiver comprises a Doppler Fast Fourier Transform (FFT) device for deriving said Doppler frequency data.

4. A frequency modulated continuous wave radar system according to claim 3, including a Range Fast Fourier Transform (FFT) device operable to derive said frequency tone data corresponding to a plurality of range gates.

5. A frequency modulated continuous wave radar system according to claim 4, the receiver comprising signal processing means arranged to process said derived frequency tones data so as derive data indicative of movement of said target, and to transmit said derived movement data to a display means, said display means being located remote from said radar system.

6. A frequency modulated continuous wave radar system according to claim 1, wherein the electronically steered antenna comprises a frequency scanning antenna and the radar system comprises a frequency generator, the frequency generator being arranged to generate a plurality of sets of signals, each set having a different characteristic frequency, the frequency generator comprising a digital synthesiser arranged to modulate a continuous wave signal of a given characteristic frequency by a sequence of modulation of patterns whereby to generate a said set of signals.

7. A frequency modulated continuous wave radar system according to claim 1, wherein the electronically steered antenna comprises a phased antenna having a plurality of antenna elements, the antenna elements being spatially arranged with respect to one another and being operable to transceive signals, wherein the radar system comprises delay circuitry arranged to apply an amount of delay to the signals transceived by antenna elements.

8. A frequency modulated continuous wave radar system according to claim 1, wherein the electronically steered antenna comprises a phased antenna having a plurality of antenna elements, the antenna elements being spatially arranged with respect to one another and being operable to transceive signals, wherein the radar system comprises phase shift circuitry arranged to apply an amount of phase shift to the signals transceived by antenna elements.

* * * * *